US010486684B2

(12) United States Patent
Collins et al.

(10) Patent No.: US 10,486,684 B2
(45) Date of Patent: Nov. 26, 2019

(54) HEV ENERGY MANAGEMENT FOR HIGH PERFORMANCE OPERATION

(71) Applicant: FORD GLOBAL TECHNOLOGIES, LLC, Dearborn, MI (US)

(72) Inventors: Patrick Gordon Collins, Canton, MI (US); Anthony Boyko, Dearborn, MI (US); Lars Niklas Pettersson, Novi, MI (US); Matthew L. West, Madison Heights, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 216 days.

(21) Appl. No.: 15/629,541

(22) Filed: Jun. 21, 2017

(65) Prior Publication Data
US 2018/0370522 A1    Dec. 27, 2018

(51) Int. Cl.
| B60W 20/14 | (2016.01) |
| B60W 10/18 | (2012.01) |
| B60W 10/08 | (2006.01) |
| B60W 10/06 | (2006.01) |
| B60W 10/184 | (2012.01) |
| B60W 10/26 | (2006.01) |

(52) U.S. Cl.
CPC ............ *B60W 20/14* (2016.01); *B60W 10/06* (2013.01); *B60W 10/08* (2013.01); *B60W 10/184* (2013.01); *B60W 10/26* (2013.01); *B60W 2710/0677* (2013.01); *B60W 2710/083* (2013.01); *B60W 2710/244* (2013.01); *B60W 2720/10* (2013.01); *Y10S 903/93* (2013.01)

(58) Field of Classification Search
CPC ...... B60W 20/14; B60W 10/06; B60W 10/08; B60W 10/184; B60W 10/26; B60W 2710/0677; B60W 2710/083; B60W 2710/244; B60W 2720/10; Y10S 903/93
USPC ........................................................ 701/22
See application file for complete search history.

(56) References Cited

U.S. PATENT DOCUMENTS

| 7,900,726 B2 | 3/2011 | Kidston et al. |
| 9,399,461 B2 | 7/2016 | Yamazaki et al. |
| 2013/0179014 A1 | 7/2013 | Yamazaki et al. |
| 2016/0368479 A1* | 12/2016 | Kim ................ B60W 10/06 |

* cited by examiner

*Primary Examiner* — Marthe Y Marc-Coleman
(74) *Attorney, Agent, or Firm* — David B. Kelley; Brooks Kushman P.C.

(57) ABSTRACT

A vehicle includes a combustion engine (CE) and electric machine (EM) coupled to an energy storage system (ESS) and a controller, which are configured to maximize ESS/battery charge recovery during high performance operation. The controller commands the CE to generate power exceeding road load power and power demand (PD), to recharge the ESS at a maximum rate for rapid ESS charge recovery. Responsive to the PD, the CE generates a maximum power to drive the EM to recharge the ESS at a maximum rate during acceleration, deceleration, and when maintaining velocity of the vehicle, and to generate positive torque and discharge the ESS when PD and road load power exceeds CE maximum power, according to the PD, road load power, and maximum ESS charge rate. Power regeneration during deceleration may also be enabled for the electric machine and/or regenerative brakes, which further maximizes ESS SoC recovery during high performance operation.

20 Claims, 5 Drawing Sheets

(MAXIMUM ACCELERATION)

(ACCELERATION & MAINTAIN VELOCITY)

(DECELERATION)

(MAXIMUM DECELERATION)

HEV ENERGY MANAGEMENT FOR HIGH PERFORMANCE OPERATION

TECHNICAL FIELD

The disclosure is related to hybrid electric vehicles having combustion engines and electric machines configured to generate and store power for propulsion and energy storage recovery.

BACKGROUND

Hybrid Electric Vehicles (HEVs) having an internal combustion engine (ICE) and electric machines or traction motor/generators (M/Gs) coupled with energy storage systems, are typically configured to optimize fuel consumption and optimal energy storage system (ESS) and battery life. For certain applications, HEVs may also be configured to override and/or switch between fuel consumption and ESS/battery life optimization configurations, and high performance operations that command combined, maximum power output from ICE and M/G, as well as maximum energy recovery for the ESS/battery. Such high performance operation has in the past caused depletion of the ESS or batteries, which has constrained performance of the HEV until energy can be recovered by the ESS/batteries.

SUMMARY

The present disclosure enables new capabilities for improved control and management of HEV high performance modes of operation, which may be driver selectable in addition to a nominal operation mode that conserves fuel and ESS/battery power. The innovation enables rapid ESS charge recovery during high performance HEV operation, which prevents and/or reduces the likelihood of ESS depletion. The HEV includes a combustion engine (CE) and an electric machine (EM) coupled to an energy storage system (ESS), such as one or more batteries, and a controller, which are configured to enable maximized or high priority ESS charge recovery during operation. When a state of charge (SoC) of the ESS or battery(ies) are below an SoC charge-capacity limit, the controller may command the CE to generate power that exceeds a road load power (RLP) and a power demand (PD) up to a maximum CE power, which enables rapid charge recovery of the ESS to prevent or minimize depletion, at a rate according to the exceeding or surplus power available after PD and RLP are met, and up to a ESS/battery maximum recharge rate.

When PD power is required during such a high performance operation mode, the CE generates a maximum power that is utilized in part to accelerate, decelerate, and/or maintain the velocity of the vehicle, and to also drive the EM to generate negative torque to recharge the ESS/battery(ies), up to the maximum recharge rate, according to the power available for ESS/battery charge recovery after the PD and RLP power demands are satisfied. The HEV also enables power regeneration and/or recapture during deceleration, which utilizes the electric machine and/or regenerative brakes, and which can be employed to further maximize rapid ESS/battery SoC recovery.

The improved system and method of operation includes a vehicle or HEV having or being provided with an internal combustion engine (ICE or CE), and an electric machine and/or motor/generator (EM or M/G), which are coupled to an energy storage system (ESS), such as a battery that has an instantaneous and maximum state of charge (SoC) limit, and a maximum recharge rate at which SoC can be recovered. Also incorporated is a controller that is configured to respond to a power demand and/or power demand signal (PD or PDS), and to command the ICE and M/G to generate a combined power that exceeds a combination of the RLP and the PDS, to establish a surplus amount of power. The power accelerates and/or maintains the velocity of the HEV, and the surplus power that exceeds is utilized to recharge the ESS at a charge rate that may vary up to the maximum recharge rate, up to and until the ESS SoC is fully recovered and the SoC limit is attained and/or while the SoC is below the limit.

The controller of the HEV or vehicle is also configured to respond to the PDS demanding power that is less than a maximum ICE power, and to command the ICE to generate the maximum ICE power that in part accelerates the vehicle and which also enables or drives the M/G to generate negative torque to recharge the ESS and/or battery until the SoC limit is reached and/or while the SoC is below the limit. The controller is also configured in variations to respond to the PDS demanding power greater than or equal to a maximum ICE power, and to command the ICE and the M/G to generate a maximum combined power to accelerate the vehicle, such that the ESS discharges and delivers power to the M/G at a rate according to the PDS, which enables maximum HEV performance by utilized positive torque output of both the ICE and the M/G in combination.

In further alternative arrangements, the controller is further configured to, in response to the PDS demanding power equal to the RLP, command the ICE to generate a maximum power that in part maintains a velocity of the vehicle and which also drives the M/G to generate negative torque to recharge the ESS while the SoC is below the limit. In another contemplated variation, the controller is also configured to respond to the PDS demanding power less than the RLP and greater than the ESS/battery maximum recharge rate. In this configuration, the controller: (a) commands the M/G to regeneratively decelerate the vehicle by generating negative torque, and to deliver power to the ESS/battery at a regen rate, and (b) commands the ICE to generate power to drive the M/G to generate added negative torque to deliver power to the ESS at an added rate, such that the regen and added rates equal the maximum ESS recharge rate.

In an alternative configuration to the preceding arrangements, the vehicle includes at least one regenerative brake that is coupled to a driveline of the vehicle, which may be an independent component, and/or coupled to, part of, and/or integral with the M/G. Here, the controller is further configured to respond to the PDS demanding power that is less than the RLP and greater than the ESS maximum recharge rate. In this variation, the controller commands: (a) one or more of the M/G and the at least one regenerative brake to regeneratively decelerate the vehicle by generating negative torque, and to deliver power therefrom to the ESS at a regen rate, and (b) the ICE to generate power to drive the M/G to generate added negative torque to deliver power to the ESS at an added rate, such that the regen and added rates equal the ESS maximum recharge rate.

In further adaptations, the vehicle includes the at least one of a regenerative brake and a friction brake, which are coupled to the driveline of the vehicle. The controller of this variation is further configured to, in response to the PDS demanding power less than the RLP and less than or equal to the ESS/battery maximum re charge rate, command: (a) one or more of the M/G and the at least one regenerative brake to regeneratively decelerate the vehicle by generating negative torque, and to deliver power to the ESS at a regen rate equal to the ESS maximum recharge rate, and (b) command the at least one friction brake to further decelerate the vehicle according to the PDS and recharge rate.

This summary of the implementations and configurations of the HEVs and described components and systems introduces a selection of exemplary implementations, configurations, and arrangements, in a simplified and less technically detailed arrangement, and such are further described in more detail below in the detailed description in connection with the accompanying illustrations and drawings, and the claims that follow.

This summary is not intended to identify key features or essential features of the claimed technology, nor is it intended to be used as an aid in determining the scope of the claimed subject matter. The features, functions, capabilities, and advantages discussed here may be achieved independently in various example implementations or may be combined in yet other example implementations, as further described elsewhere herein, and which may also be understood by those skilled and knowledgeable in the relevant fields of technology, with reference to the following description and drawings.

BRIEF DESCRIPTION OF THE DRAWINGS

A more complete understanding of example implementations of the present disclosure may be derived by referring to the detailed description and claims when considered with the following figures, wherein like reference numbers refer to similar or identical elements throughout the figures. The figures and annotations thereon are provided to facilitate understanding of the disclosure without limiting the breadth, scope, scale, or applicability of the disclosure. The drawings are not necessarily made to scale.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

As those of ordinary skill in the art should understand, various features, components, and processes illustrated and described with reference to any one of the figures may be combined with features, components, and processes illustrated in one or more other figures to produce embodiments that should be apparent to those skilled in the art, but which may not be explicitly illustrated or described. The combinations of features illustrated are representative embodiments for typical applications. Various combinations and modifications of the features consistent with the teachings of this disclosure, however, could be desired for particular applications or implementations, and should be readily within the knowledge, skill, and ability of those working in the relevant fields of technology.

Figure 1:
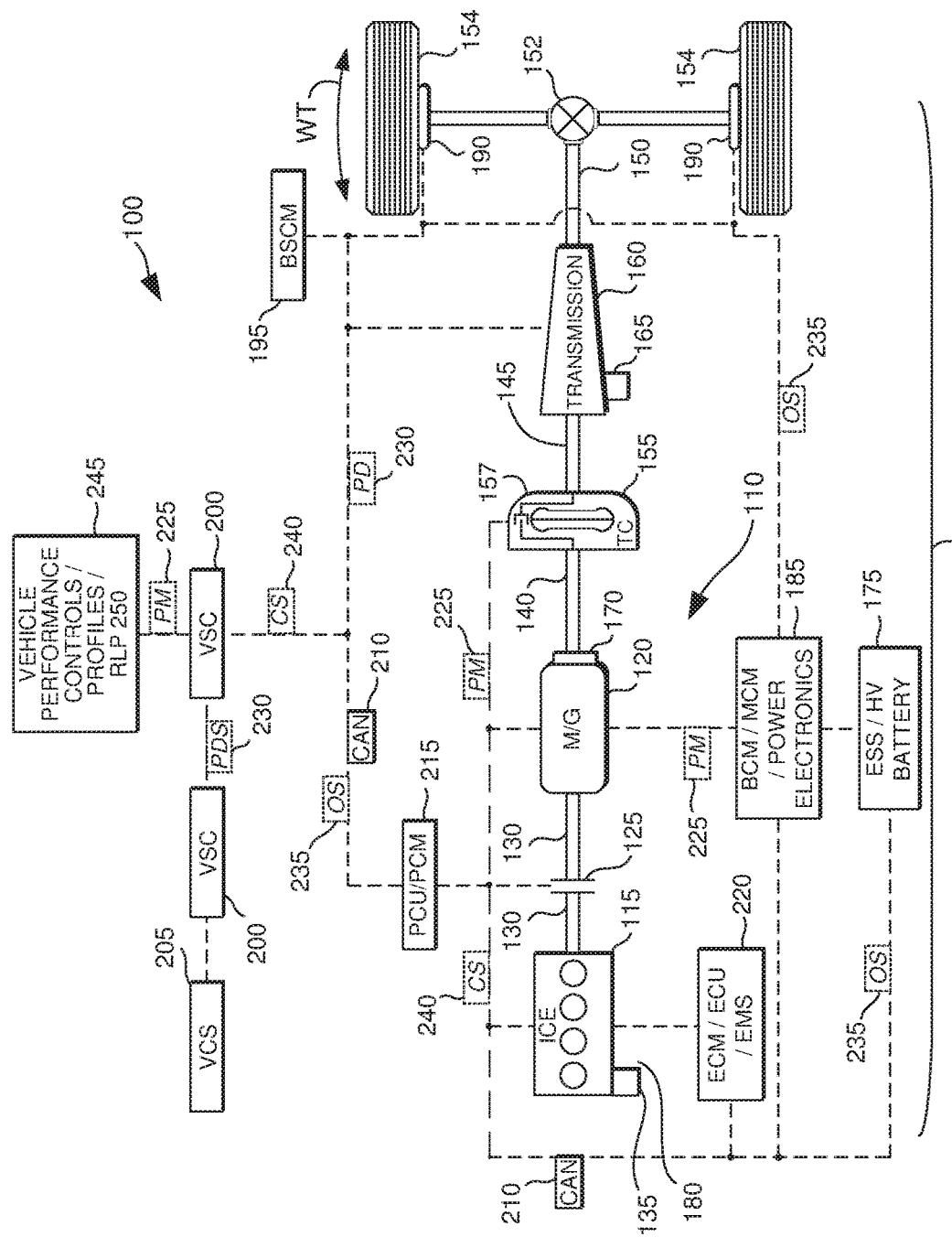
FIG. 1 is an illustration of according to the disclosure of a hybrid electric vehicle and its systems, components, sensors, actuators, and operational functions.
Figure 2:
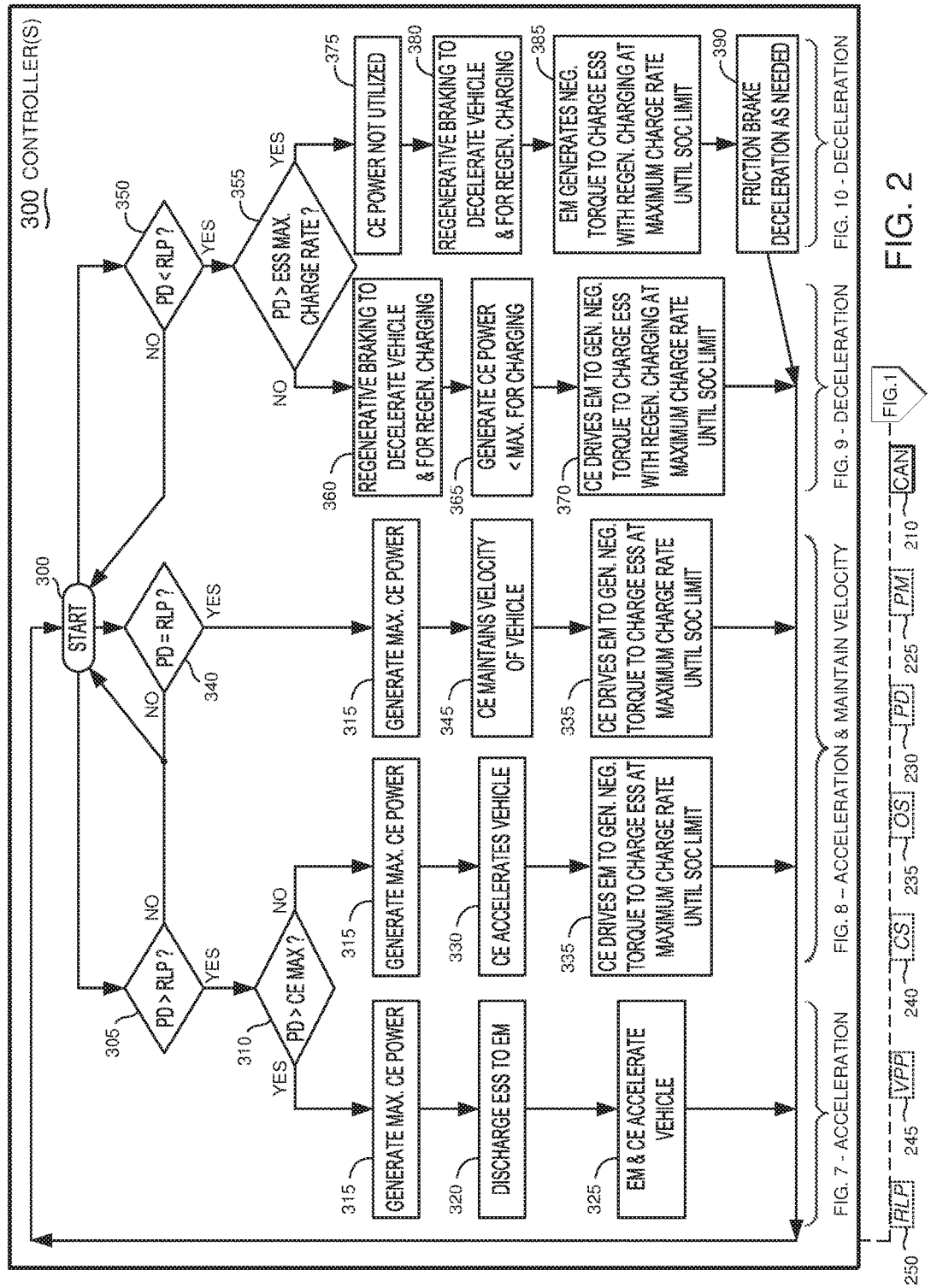
FIG. 2 illustrates certain aspects of the disclosure depicted in FIG. 1, and describes examples, components, and method steps that depict other operational capabilities of the disclosure.

With reference now to the various figures and illustrations that include FIGS. 1 and 2, and specifically to FIG. 1, a schematic diagram of a hybrid electric vehicle (HEV) 100 is shown, and illustrates representative relationships among components of HEV 100. Physical placement and orientation of the components within vehicle 100 may vary. Vehicle 100 includes a driveline 105 that has a powertrain 110, which includes a combustion engine (CE) that may be an internal combustion engine (ICE) 115 and an electric machine (EM) and/or electric motor/generator/starter (M/G) 120, which each generate power and torque to generate traction and propel vehicle 100. The terms power and torque are used herein sometimes interchangeably to describe examples of generating, controlling, and communicating energy between components of HEV 100. Those knowledgeable in the relevant fields of technology should comprehend that such interchangeable uses are to be understood in context, wherein torque and power are to have their conventional meanings, and that as used here, torque may be recited in a context that includes or implies a time element, and power may be used in a context that includes or implies an instantaneous magnitude without regard for a time element.

Engine 115 is a gasoline, diesel, biofuel, natural gas, or alternative fuel powered engine, or a fuel cell, which generates an output torque in addition to other forms of electrical, cooling, heating, vacuum, pressure, and hydraulic power by way of front end engine accessories and devices (FEADs) described elsewhere herein. Engine 115 is coupled to electric machine or M/G 120 with a disconnect clutch 125. Engine 115 generates power and associated engine output torque for transmission to M/G 120 when disconnect clutch 125 is at least partially engaged.

M/G 120 may be any one of a plurality of types of electric machines, and for example may be a permanent magnet synchronous motor, electrical power generator, and engine starter 120. For example, when disconnect clutch 125 is at least partially engaged, power and torque may be transmitted between engine 115 to M/G 120 to enable negative torque operation as an electric generator, and to other components of vehicle 100. Similarly, M/G 120 may operate as a starter for engine 115 with disconnect clutch 125 partially or fully engaged to transmit power and torque via disconnect clutch drive shafts 130 to engine 115 to start engine 115, in vehicles that include or do not include an independent engine starter 135.

Further, M/G or electric machine 120 may assist engine 115 in a "hybrid electric mode" or an "electric assist mode" by transmitting additional power and torque to turn drive shafts 130 and 140. Also, M/G 120 may operate in an electric only mode wherein engine 115 is decoupled by disconnect clutch 125 and shut down, enabling M/G 120 to transmit positive or negative torque to M/G drive shaft 140 for forward and reverse propulsion to enable respective forward and reverse motion of HEV 100. When in generator mode, M/G 120 may also be commanded to produce negative torque (not transmitted to shaft 140 for propulsion) and to thereby generate electricity for charging batteries and powering vehicle electrical systems, while engine 115 is idling, shut-down, and/or generating propulsion power for vehicle 100.

Although the terms and phrases positive and negative, and positive and negative torque are used herein in various contexts, such sign conventions are meant to be interchangeable with other conventions, and are introduced for purposes of example and are not meant to be limiting. For example, although the phrase negative torque here is used in connection with EM, M/G 120 to depict a mode of operation wherein EM, M/G 120 generates electricity, and also to indicate reverse propulsion motion for movement of HEV 100, it is intended that such uses are merely conveyed for purposes of example, explanation, and illustration, without limitation. Further, although the terms positive and negative may be used in certain examples, the same and other examples and contexts may recite, include, and/or imply a magnitude when such positive and negative torques and powers are compared and given as relative and illustrative examples.

M/G 120 also may enable regenerative braking by converting rotational, kinetic energy from driveline 105 and powertrain 110 and/or wheels 154 during deceleration, into regenerated and recaptured electrical energy for storage, in energy storage system (ESS), which may be one or more high-voltage (HV) batteries 175, 180, as described in more detail below. Alternatively, ESS 175 may be and may include other energy storage devices, including for example without limitation, capacitors, mechanical fly-wheels, low voltage integrated starter generator systems, and other types of kinetic energy storage/recovery/transmission systems.

Disconnect clutch 125 may be disengaged to enable engine 115 to stop or to run independently for powering engine accessories, while M/G 120 generates drive power and torque to propel vehicle 100 via M/G drive shaft 140, torque convertor drive shaft 145, and transmission output drive shaft 150. In other arrangements, both engine 115 and M/G 120 may operate with disconnect clutch 125 fully or partially engaged to cooperatively propel vehicle 100 through drive shafts 130, 140, 150, differential 152, and wheels 154.

Vehicle 100 and driveline 105 may also incorporate one or more friction, regenerative, and/or combination regenerative-friction brakes 190 coupled to wheels 154 and brake system control module (BSCM) 195. Such regenerative braking may also be utilized from one or any wheel 154 using a selectable and/or controllable differential torque capability. As described here, use of the phrases brakes 190, or regenerative-friction brakes 190 is intended, for example, to contemplate one or more or combinations of such friction, regenerative, and/or combination regenerative-friction brakes 190. Brakes 190 and BSCM 195 may be operative to mechanically and/or electrically decelerate wheels 154, and to enable regenerative braking that captures deceleration energy from wheels 154, and in cooperation with MCM/BCM 185, and possibly other controllers, M/G 120, and other components, enable(s) energy recovery of ESS 175 and charging of HV battery(ies) 175 and other batteries 180, and other power and energy storage components of ESS 175.

Drive shaft 130 of engine 115 and M/G 120 may be a continuous, single, through shaft that is part of, and integral with M/G drive shaft 140, or may be a separate, independent drive shaft 130 that may be configured to turn independently of M/G drive shaft 140, for powertrains 110 that include multiple, inline, or otherwise coupled M/G 120 configurations. The schematic of FIG. 1 also contemplates alternative configurations with more than one engine 115 and/or M/G 120, which may be offset from drive shafts 130, 140, and where one or more of engines 115 and M/Gs 120 are positioned in series and/or in parallel elsewhere in driveline 105, such as between or as part of a torque convertor and a transmission, off-axis from the drive shafts, and/or elsewhere and in other arrangements. Still other variations are contemplated without deviating from the scope of the present disclosure.

Driveline 105 and powertrain 110 also include a torque convertor (TC) 155, which couples engine 115 and M/G 120 of powertrain 110 with and/or to a transmission 160. Transmission 160 may be a multiple step-ratio, and/or a multiple and variable torque-multiplier-ratio, automatic and/or manual transmission or gearbox 160 having a plurality of selectable gears. TC 155 may further incorporate a bypass clutch and clutch lock 157 that may also operate as a launch clutch, to enable further control and conditioning of the power and torque transmitted from powertrain 110 to other components of vehicle 100.

In other variations, a transmission oil pump 165 is included and is coupled to M/G 120 to produce hydraulic oil pressure for any number of components, which can include, for example, release or disconnect clutch 125, torque converter 155, bypass clutch 157, and transmission 160, when engine 115 is decoupled and/or powered down. An electric auxiliary transmission oil pump 170 may also be included for use alone or in combination with other components, and to also supplement and/or generate hydraulic pressure when both engine 115 and M/G 120 are unpowered, or otherwise unable to produce hydraulic pressure.

Powertrain 110 and/or driveline 105 further include the ESS 175, which may further incorporate the one or more batteries 175, 180. One or more such batteries can be a high voltage (HV), direct current battery or batteries 175 that operate in ranges between about 48 to 600 volts, and sometimes between about 140 and 300 volts or more or less, which is/are used to store and supply power for M/G 120 and during regenerative braking, and for other vehicle components and accessories. Other batteries can be a low voltage, direct current battery(ies) 180 operating in the range of between about 6 and 24 volts or more or less, which is/are used to store and supply power for starter 135 to start engine 115, and for other vehicle components and accessories.

ESS 175, such as batteries 175, 180 are respectively coupled to engine 115, M/G 120, and vehicle 100, as depicted in FIG. 1, through various mechanical and electrical interfaces and vehicle controllers, as described elsewhere herein. Components of ESS 175, such as HV battery 175 are also coupled to M/G 120 by one or more of a motor control module (MCM), a battery control module (BCM), and/or power electronics 185, which are configured to condition power exchange between ESS 175, such as direct current (DC) power provided by HV battery 175 for M/G 120. MCM/BCM/power electronics 185 are also configured to condition, invert, and transform DC battery power into three phase alternating current (AC) as is typically required to power electric machine or M/G 120. MCM/BCM 185/power electronics are also configured to charge one or more batteries 175, 180 with energy generated by M/G 120 and/or front end accessory drive components, and to supply power to other vehicle components as needed.

With continued reference to FIG. 1, vehicle 100 further includes one or more controllers and computing modules and systems, in addition to MCM/MCM/power electronics 185, which enable a variety of vehicle capabilities. For example, vehicle 100 may incorporate a vehicle system controller (VSC) 200 and a vehicle computing system (VCS) and controller 205, which are in communication with MCM/BCM 185, other controllers, and a vehicle network such as a controller area network (CAN) 210, and a larger vehicle control system and other vehicle networks that include other micro-processor-based controllers as described elsewhere herein. CAN 210 may also include network controllers in addition to communications links between controllers, sensors, actuators, and vehicle systems and components.

While illustrated here for purposes of example, as discrete, individual controllers, MCM/BCM 185, BSCM 195, VSC 200 and VCS 205 may control, be controlled by, communicate signals to and from, and exchange data with other controllers, and other sensors, actuators, signals, and components that are part of the larger vehicle and control systems and internal and external networks. The capabilities and configurations described in connection with any specific micro-processor-based controller as contemplated herein may also be embodied in one or more other controllers and distributed across more than one controller such that multiple controllers can individually, collaboratively, in combination, and cooperatively enable any such capability and configuration. Accordingly, recitation of "a controller" or "the controller(s)" is intended to refer to such controllers both in the singular and plural connotations, and individually, collectively, and in various suitable cooperative and distributed combinations.

Further, communications over the network and CAN 210 are intended to include responding to, sharing, transmitting, and receiving of commands, signals, data, control logic, and information between controllers, and sensors, actuators, controls, and vehicle systems and components. The controllers communicate with one or more controller-based input/output (I/O) interfaces that may be implemented as single integrated interfaces enabling communication of raw data and signals, and/or signal conditioning, processing, and/or conversion, short-circuit protection, circuit isolation, and similar capabilities. Alternatively, one or more dedicated hardware or firmware devices, controllers, and systems on a chip (SoCs) may be used to precondition and preprocess particular signals during communications, and before and after such are communicated.

In further illustrations, MCM/BCM 185, BSCM 195, VSC 200, VCS 205, CAN 210, and other controllers, may include one or more microprocessors or central processing units (CPU) in communication with various types of computer readable storage devices or media. Computer readable storage devices or media may include volatile and nonvolatile storage in read-only memory (ROM), random-access memory (RAM), and non-volatile or keep-alive memory (NVRAM or KAM). NVRAM or KAM is a persistent or non-volatile memory that may be used to store various commands, executable control logic and instructions and code, data, constants, parameters, and variables needed for operating the vehicle and systems, while the vehicle and systems and the controllers and CPUs are unpowered or powered off. Computer-readable storage devices or media may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing and communicating data.

With attention invited again to FIG. 1, vehicle 100 also may include VCS 205 to be the SYNC onboard vehicle computing system manufactured by the Ford Motor Company (See, for example, U.S. Pat. No. 9,080,668). Vehicle 100 also may include a powertrain control unit/module (PCU/PCM) 215 coupled to VSC 200 or another controller, and coupled to CAN 210 and engine 115, M/G 120, and TC 155, to control each powertrain component. An engine control module (ECM) or unit (ECU) or energy management system (EMS) 220 may also be included having respectively integrated controllers and be in communication with CAN 210, and is coupled to engine 115 and VSC 200 in cooperation with PCU 215 and other controllers. In this arrangement, VSC 200 and VCS 205 cooperatively manage and control the vehicle components and other controllers, sensors, and actuators. For example, the controllers may communicate control commands, logic, and instructions and code, data, information, and signals to and/or from engine 115, disconnect clutch 125, M/G 120, TC 155, transmission 160, ESS 175 and batteries 175, 180, and MCM/BCM/power electronics 185, friction and regenerative brakes 190, BSCM 195, and other components and systems. Although depicted as independent components for purposes of illustration, regenerative brakes 190 may also be replaced by, coupled to, part of, and/or integral with the M/G 120, or another component of vehicle 100. The controllers also may control and communicate with other vehicle components known to those skilled in the art, even though not shown in the figures. The embodiments of vehicle 100 in FIG. 1 also depict exemplary sensors and actuators in communication with vehicle network and CAN 210 that can transmit and receive signals to and from VSC 200, VCS 205, and other controllers.

For further example, various other vehicle functions, actuators, and components may be controlled by the controllers within the vehicle systems and components, and may receive signals from other controllers, sensors, and actuators, which may include, for purposes of illustration but not limitation, front-end accessory drive (FEAD) components such as transmission oil pump 165, a FEAD alternator or generator, M/G 120, ESS 175, high and low voltage batteries 175, 180, and various sensors for battery charging or discharging (including sensors for determining an ESS 175 or battery 175 maximum charge, recharge, and discharge rates, a state of charge (SoC) limit, among other parameters), temperatures, voltages, currents, and battery cycles, and other components. Sensors communicating with the controllers and CAN 210 may, for further example, establish or indicate engine rotational speed or revolutions per minute, wheel speeds, vehicle speed sensing, and ignition switch position, and operation mode settings and configurations, among others.

As depicted in the various figures, including FIGS. 1 and 2, and others, such control logic and executable instructions and signals, and data can also include vehicle performance mode signals (PMs) 225, power demand and demand signals (PD, PDS) 230, other signals (OS) 235, and control or command signals (CS) 240 received from and sent to vehicle controllers, components, and systems. Such signals and commands may be from any of the vehicle controllers, sensors, actuators, components, and systems signals. Any or all of these signals can be raw analog or digital signals or preconditioned, preprocessed, combination, and/or derivative signals generated in response to other signals, and embedding information therein.

PMs 225, PDs/PDSs 230, OSs 235, and/or CSs 240 may include a variety of specific signals, including for purposes of illustration without limitation, current or instantaneous SoC, SoC limit(s), charge, recharge, and discharge rate(s), transmission input speed, charge-torque, and various limit signals, as well as digital data and information embedded in such signals, which may include vehicle performance controls/parameters (VPPs) 245, and as described in more detail elsewhere herein. Such VPPs may include various vehicle performance parameters and settings that can control and optimize fuel and charge-discharge efficiency of ICE 115, EM and M/G 120, and other components and systems. Such VPPs 245 may also include one or more settings and parameters that establish a road load power (RLP) 250 for HEV 100, which may define aspects of performance of HEV 100 at various speeds, settings, and configurations that may define for example without limitation, and among other parameters, propulsion and parasitic power needs and losses due to aerodynamic drag, rolling resistance, driveline losses, power transmission and conversion losses, and performance effects due external environmental temperature, pressure, and humidity, and other parameters. PMs 225 may also store, adjust, and/or communicate such VPPs 245.

The communication and operation of the described signals, control instructions and logic, and data and information, including for example but not limitation PMs 225, PDs/PDSs 230, OSs 235, CSs 240, and/or VPPs 245, by the various contemplated controllers, sensors, actuators, and other vehicle components, may be represented schematically as shown in FIG. 1, and by flow charts or similar diagrams as exemplified in FIG. 2, and elsewhere herein. Such flow charts and diagrams illustrate exemplary commands and control processes, control logic and instructions, and operation strategies, which may be implemented using one or more computing, communication, and processing techniques that can include real-time, event-driven, interrupt-driven, multi-tasking, multi-threading, and combinations thereof. The steps and functions shown may be executed, communicated, and performed in the sequence depicted, and in parallel, in repetition, in modified sequences, and in some cases may be combined with other processes and omitted. The commands, control logic, and instructions may be executed in one or more of the described microprocessor-based controllers and may be embodied as primarily hardware, software, virtualized hardware, firmware, virtualized firmware, and combinations thereof.

With continuing reference to FIGS. 1 and 2, the disclosure contemplates HEV 100 including ICE 115 coupled with electric machine or M/G 120 and ESS 175 such as HV storage battery 175, and various controllers. As described, such other controller(s) may include, for example, MCM/BCM/power electronics 185, BSCM 195, PCU/PCM 215, VSC 200, and VCS 205, and others. Such controllers are configured to detect a predetermined mode of operation of HEV 100 that may be stored and received from VPPs 245, and which may be communicated by PM 225. Such predetermined modes of operation or operation modes may establish a fuel and SoC conservation and optimization operation mode, a high performance mode that enables maximum performance, and other operation modes, which may be predetermined, and automatically and/or driver selectable and deselectable.

Further, such high performance modes may also enable enhanced SoC recovery capabilities that are configured for rapid and maximized power recovery of ESS 175, such as batteries 175, when such are depleted and/or discharged below an SoC limit or maximum SoC capacity during the high performance operation mode. During the high performance operation mode, CE or ICE 115 may be prevented from powering down and may instead run continuously, to enable continuous recharging of ESS 175. In some configurations of HEV 100 that include CE or ICE 115 to have gas turbo direct injection engines, the continuous operation of CE/ICE 115 may also be configured to reduce the effects of turbo lag during peak performance power and torque demand.

For the contemplated high performance operation mode, reference is now also specifically made to FIGS. 2, 3, 4, 5, 6, 7, 8, and 9. Here, FIG. 1 depicts CE or ICE 115, EM or M/G 120, and ESS/battery(ies) 175, being coupled with one or more of the described controllers that is/are configured to detect PD/PDS 230. In response, the controller(s) are also configured to command CE 115 to generate an engine power (EP) 255, exceeding or which exceeds a combination of the road load power (RLP) 250 and the PD 230. The CE 115 surplus power that exceeds RLP 250 and PD 230, is utilized to drive EM or M/G 120 to generate negative torque and charge power (CP) 260 to deliver electrical power to recharge ESS/battery(ies) 175, to an SoC limit, and at up to an ESS/battery maximum charge rate 265 (see also, FIGS. 2, 3, 4, 5, and 6).

Figure 3:
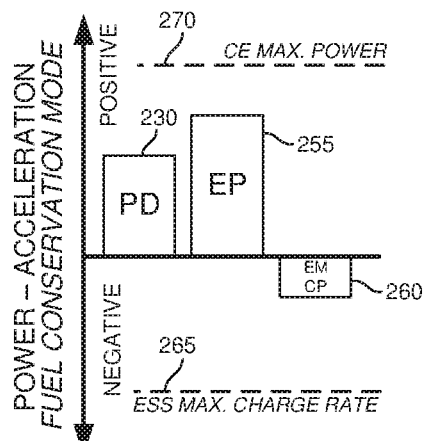
FIGS. 3, 4, 5, and 6 depict other aspects of the vehicle systems and methods of FIGS. 1 and 2 for illustration purposes.
Figure 4:
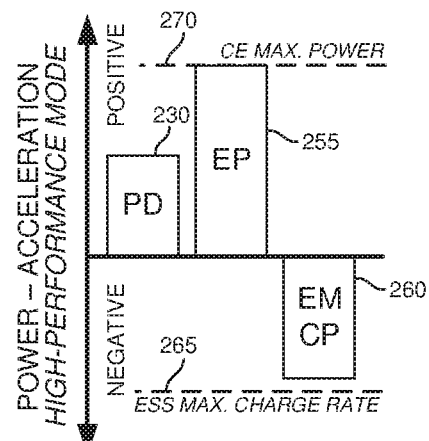

FIG. 3 illustrates in part a fuel conservation mode of operation that enables reduced EP 255 and CP 260, which does not enable rapid power recovery and recharging of ESS/battery(ies) 175. In contrast, FIG. 4 reflects the contemplated high performance operation mode. For example, during operation when PD/PDS 230 demands power for propelling HEV 100 that is less than a maximum power 270 of CE 115 (FIG. 4), the controller(s) are configured to respond and command CE/ICE 115 to generate the maximum ICE power 270 (FIG. 4) in part to accelerate HEV 100, and to also drive EM or M/G 120 to generate maximum negative torque and CP 260 (FIG. 4). The maximum CP 260 is generated according to the maximum ICE power 270 and the PDS 230, to recharge ESS/battery(ies) 175 while the SoC is below the limit. For example, the maximum CP 260 may equal the maximum EP 270 or EP 255 less the PDS 230 and relevant power losses noted elsewhere herein.

With continuing reference to the various figures, and now specifically again to FIG. 2, during operation of HEV 100, the controller(s) described elsewhere herein may be embodied as controller(s) 300 and detect whether PD 230 exceeds, equals, and/or is less than RLP 250. The controller(s) then adjust(s) the high performance configuration of HEV 100 and its various components and systems. For example, if at step 305 of FIG. 2, the controller(s) detect PD 230 to be greater than RLP 250, then it is next determined at step 310 whether PD 230 is also greater than maximum ICE power 270. In this example of steps 305 and 310, PD 230 may in this exemplary context be deemed to be a positive PD 230, which implies an acceleration demand, but may also be deemed in certain engineering conventions to be a magnitude or another connotation. RLP 250 may also be deemed to have a sign or magnitude that is consistent with a sign or magnitude convention of PD 230.

In either condition, maximum performance and acceleration is demanded by PD 230 and maximum ICE power 270 is commanded at step 315. If PD 230 is greater than maximum ICE power 270 that is available from ICE 115, then at step 320, the controller(s) command ESS/battery(ies) 175 to discharge power 260 (FIG. 7) to EM or M/G 120 to generate maximum positive EM torque. The rate of discharge power 260 is determined by PD 230 and the maximum ICE power 270, such that the discharge power rate may, for example, equal PD 230 less EP 255 and losses from power conversion between ESS 175 and EM or M/G 120. This maximum positive torque of EM 120 is combined at step 325 with the generated maximum ICE power 270, to configure driveline 105 to accelerate HEV 100, as reflected in FIG. 7 by power transmission arrow EP 255, which reflects the combined power output of EM torque and maximum ICE power 270.

Figure 8:
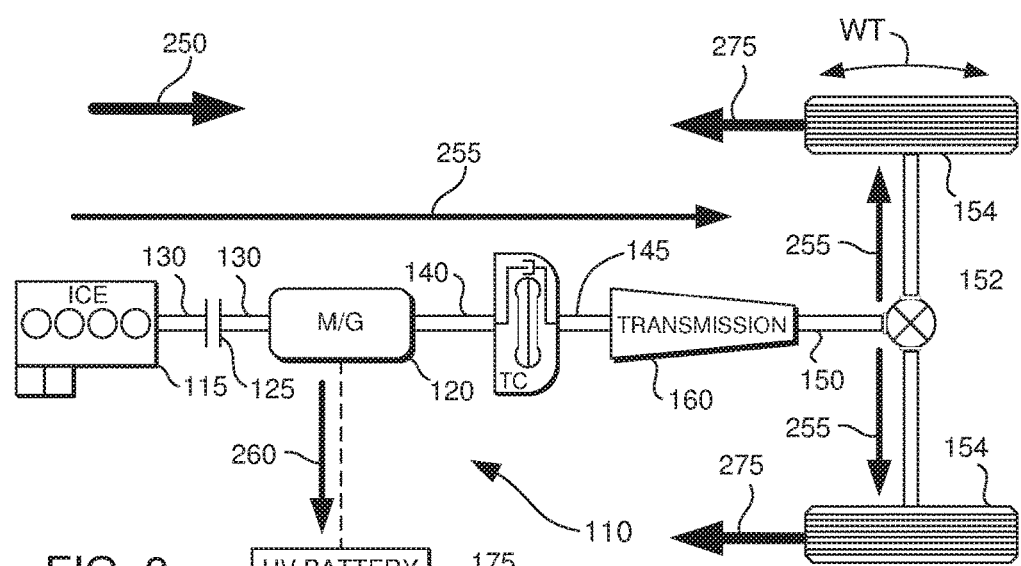
Figure 9:
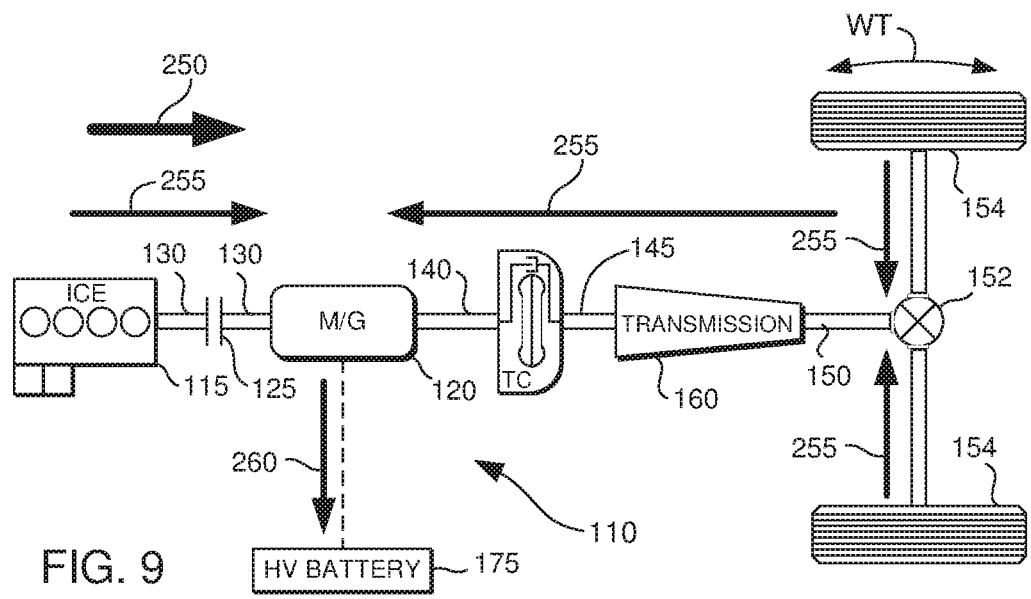
FIGS. 9 and 10 depicts additional examples of a vehicle in operation with the methods and systems of the prior figures.

Alternatively, with continuing reference to FIG. 2 and also now to FIG. 8, if PD 230 is less than the available maximum ICE power 270, then at step 330, the generated maximum ICE power 270 exceeding the RLP 250 and PD 230, which in part propels and accelerates vehicle or HEV 100, and at step 335 with the exceeding, surplus power drives EM or M/G 120 to generate negative torque and a maximum possible CP 260 (FIG. 8) according to the surplus, exceeding power, and at up to ESS/battery maximum charge rate 265, to enable maximized and rapid power recovery of ESS/battery(ies) 175, which recharging continues while the SoC is below the limit and until the SoC limit or capacity of ESS/battery)ies) 175 is attained. The maximum possible CP 260 is adjusted according to the surplus, exceeding power, which may be the EP 255 and/or the generated maximum ICE power 270, less the RLP 250 and/or PD 230 utilized or consumed to propel HEV 100.

Figure 7:
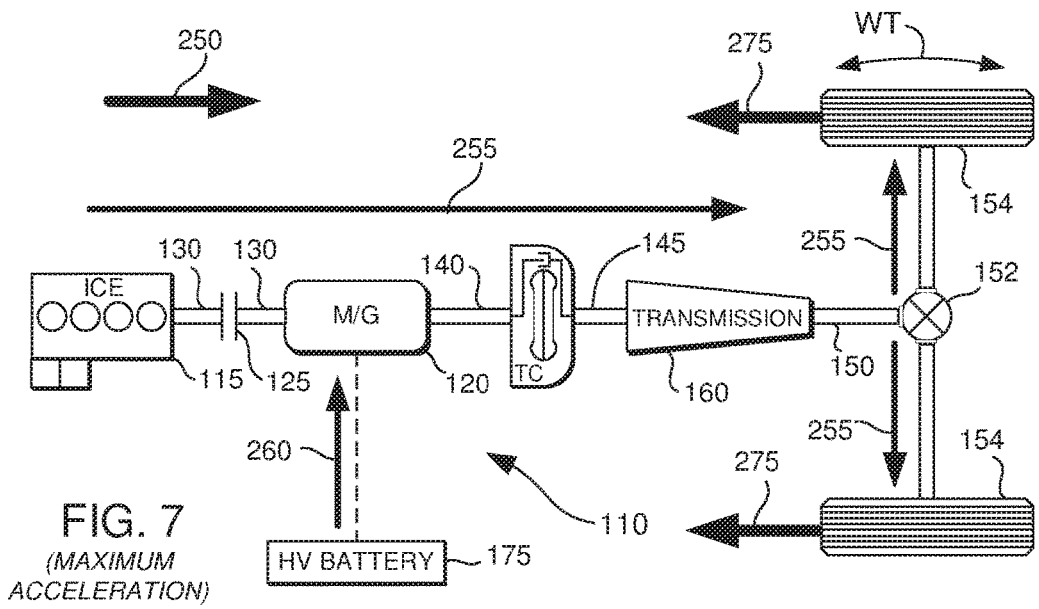
FIGS. 7 and 8 illustrate exemplary schematics of a vehicle in operation according to the systems and methods of the preceding figures.

With continuing reference to FIGS. 7 and 8, it may be understood that EP 255 drives driveline 105 to generate a tractive force 275 via wheels 154 to accelerate and/or propel HEV 100. The maximized EP 270 utilizes the surplus CE power that exceeds RLP 250 and PD 230, to also drive and enable EM 120 to generate CP 260 to recharge ESS/battery(ies) 175. With attention invited back to FIGS. 2, 4, and 8, if controller(s) 300 at step 340 detect that PD 230 equals RLP 250, then step 315 is again executed to generate maximum ICE power 270, which at step 345 utilizes maximized EP 270 in part to power driveline 105 to maintain a velocity of HEV 100. While PD 230 in this example of step 340 is not expressly recited to be positive or negative, some engineering conventions may construe or imply that this PD 230 is a positive and/or unsigned or magnitude of power demand. RLP 250 may be similarly characterized so as to be consistent with a sign or magnitude of PD 230. Additionally, the generated maximum ICE power 270 is commanded at step 335 to drive EM or M/G 120 and to generate a maximum possible CP 260 to recharge ESS/battery(ies) 175 at up to the ESS/battery maximum charge rate 265 (FIGS. 4 and 8).

Figure 5:
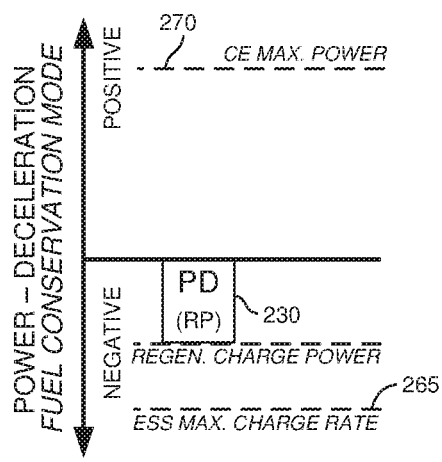

FIG. 5 reflects in part a fuel conservation mode of operation that enables deceleration of HEV 100, and which may also enable power recapture or regeneration during such deceleration and braking, but which does not enable concurrent, maximized power recovery by ESS/battery(ies) 175. In contrast, FIG. 6 reflects the contemplated high performance operation mode wherein CE or ICE 115 is utilized to maximize power recovery during regenerative deceleration and braking.

In FIG. 2, the controller(s) 300 detect at step 350 whether PD 230 is less than RLP 250, and if so then test at step 355 whether PD 230 also exceeds ESS/battery(ies) maximum recharge rate 265. Here again, as with other examples herein, a consistent engineering convention for reciting a sign and/or a magnitude is employed to ensure a technically correct and meaningful comparison between PD 230 and rate 265. In one example, the PD 230 may be characterized by any such convention to be negative, which may serve to indicate that deceleration of HEV 100 is demanded. RLP 250 may similarly be deemed to be positive to imply a momentum and/or a potential energy of a moving HEV 100, which is to be decelerated in response to PD 230, and which will enable regenerative braking and recapture of such potential energy for conversion and storage by ESS 175.

Further, ESS maximum recharge rate 265 may be deemed to be a magnitude or to be negative to indicate delivery of recharge power to ESS/battery(ies) 175 for storage.

If PD 230 exceeds rate 265, then the controller(s) 300 configure driveline 105 at step 360 to enable regenerative braking (FIG. 9, arrow 255-B) to decelerate HEV 100, and with EM or M/G 120 and/or regenerative brakes 190, to generate negative torque (FIG. 9, arrow 255-B) and CP 260 at a regenerative or "regen" rate, to recapture power and recharge ESS/battery(ies) 175. At step 365, controller(s) 300 also concurrently command CE/ICE 115 at step 370 to generate power (FIG. 9, EP 255-E) to drive EM or M/G 120, and to generate additional negative torque at an "added rate" that generates an additional CP 260, such that the combined regen and added rates establish a combined or total CP 260 that equals a rate up to the ESS maximum recharge rate 265 (FIG. 6).

Figure 6:
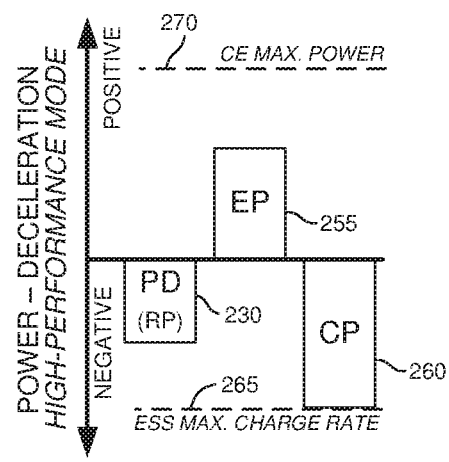
Figure 10:
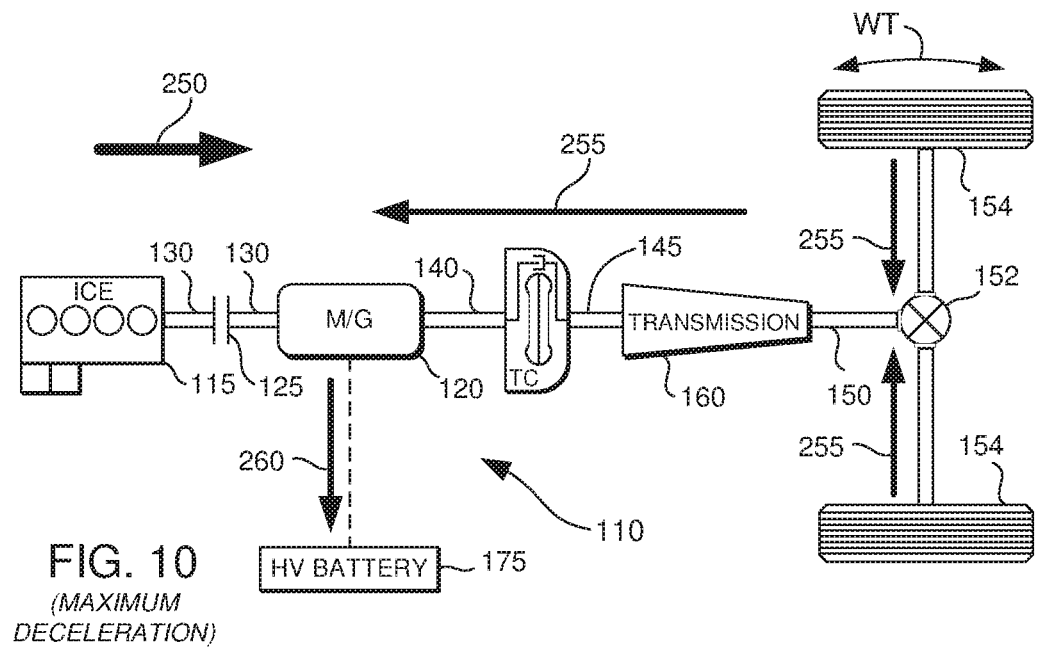

Those having skill in the relevant fields of technology, with continued reference to the preceding figures and now specifically also to FIGS. 2, 6, and 10, may understand that the controller(s) 300 at step 355 may detect PD 230 to exceed ESS/battery maximum charge rate 265, such that friction brakes 190 may be needed to decelerate HEV 100 and dissipate the energy that cannot otherwise be regenerated from negative torque and into electrical energy. Under this condition, at step 375, the controller(s) 300 configure driveline 105 to discontinue use of CE/ICE 115. At step 380, the controller(s) 300 enable regenerative braking (FIG. 9, arrow 255-B) to decelerate HEV 100 in part. At step 385, the controller(s) 300 command EM or M/G 120 and/or regenerative brakes 190, to generate negative torque (FIG. 9, arrow 255-B) and CP 260 at a regenerative or "regen" rate, to recapture power and recharge ESS/battery(ies) 175, at a rate up to the ESS/battery maximum recharge rate 265. At step 390, according to the amount of PD 230 that exceeds ESS/battery maximum recharge rate 265, the controller(s) 300 command the friction brakes 190 to dissipate the remaining power to meet the deceleration demanded by PD 230.

While exemplary embodiments are described above, it is not intended that these embodiments describe all possible forms of the invention. Rather, the words used in the specification are words of description, example, and illustration rather than limitation, and it is understood that various changes may be made without departing from the spirit and scope of the invention. Additionally, the features of various implementing embodiments may be combined to form further embodiments of the invention.

What is claimed is:

1. A vehicle, comprising:
   a combustion engine (CE);
   a motor/generator (M/G) coupled to an energy storage system (ESS) having a state of charge (SoC) limit; and
   a controller configured to, responsive to a driver power demand (PD), adjust engine power to exceed the driver PD and a road load power (RLP) that is defined by performance parameters of the vehicle, and
   such that the M/G delivers a maximum charge rate defined by the ESS while a SoC of the ESS is below the SoC limit.

2. The vehicle according to claim 1, further comprising:
   the controller configured to command, in response to the driver PD and RLP being less than a maximum CE power,
      the CE to generate the maximum CE power to accelerate the vehicle and
      the motor/generator (M/G) to generate maximum negative torque, according to the maximum CE power, RLP, and the driver PD, to recharge the ESS at the maximum charge rate while the SoC is below the SoC limit.

3. The vehicle according to claim 1, further comprising:
the controller configured to command, in response to the driver PD and RLP demanding power greater than or equal to a maximum CE power,
   the CE and the M/G to generate a maximum combined power to accelerate the vehicle, such that the ESS discharges to the M/G at a rate according to the driver PD, RLP, and maximum CE power.

4. The vehicle according to claim 1, further comprising:
the controller configured to command, in response to the driver PD demanding power equal to the RLP,
   the CE to generate maximum CE power to maintain a velocity of the vehicle and to drive the M/G to generate a maximum negative torque, according to the maximum CE power, RLP, and the driver PD, to recharge the ESS at the maximum charge rate while the SoC is below the SoC limit.

5. The vehicle according to claim 1, further comprising:
the controller configured to command, in response to the driver PD being less than the RLP and greater than the maximum charge rate:
   the M/G to regeneratively decelerate the vehicle by generating negative torque, and to deliver power to the ESS at a regen rate,
   the CE to generate power to drive the M/G to generate added negative torque to deliver power to the ESS at an added rate, and
   such that the regen and added rates equal the maximum charge rate.

6. The vehicle according to claim 1, further comprising:
at least one regenerative brake coupled to a driveline of the vehicle; and
the controller configured to command, in response to the driver PD being less than the RLP and greater than the maximum charge rate:
   one or more of the M/G and the at least one regenerative brake to regeneratively decelerate the vehicle by generating negative torque, and to deliver power to the ESS at a regen rate,
   the CE to generate power to drive the M/G to generate added negative torque to deliver power to the ESS at an added rate, and
   such that the regen and added rates equal the ESS maximum recharge rate.

7. The vehicle according to claim 1, further comprising:
at least one of a regenerative brake and a friction brake coupled to a driveline of the vehicle; and
the controller configured to command, in response to the driver PD being less than the RLP and less than or equal to the maximum charge rate:
   one or more of the M/G and the at least one regenerative brake to regeneratively decelerate the vehicle by generating negative torque, and to deliver power to the ESS at a regen rate equal to the maximum charge rate, and
   the at least one friction brake to further decelerate the vehicle according to the driver PD, RLP, and the maximum charge rate.

8. A vehicle, comprising:
a combustion engine (CE) coupled to an electric machine (EM) and a battery having a state of charge (SoC) limit; and
a controller configured to command the CE to, in response to a driver power demand (PD),
   generate a power exceeding a road load power (RLP) that is defined by performance parameters of the vehicle, and the driver PD, and
   recharge the battery at a maximum charge rate defined by the battery while a SoC of the battery is below the SoC limit.

9. The vehicle according to claim 8, further comprising:
the controller configured to command, in response to the driver PD and RLP being less than a maximum CE power,
   the CE to generate the maximum CE power to accelerate the vehicle and to drive the EM to generate negative torque to recharge the battery at the maximum charge rate to the SoC limit.

10. The vehicle according to claim 8, further comprising:
the controller configured to command, in response to the driver PD and RLP being greater than or equal to a maximum CE power,
   the CE and the EM to generate a maximum combined power to accelerate the vehicle, such that the battery discharges power to the EM at a rate according to the driver PD, RL, and the maximum CE power.

11. The vehicle according to claim 8, further comprising:
the controller configured to, in response to the driver PD being equal to the RLP,
   command the CE to generate a maximum CE power to maintain a vehicle velocity and to drive the EM to generate negative torque to recharge the battery at the maximum charge rate to the SoC limit.

12. The vehicle according to claim 8, further comprising:
the controller configured to command, in response to the driver PD being less than the RLP and greater than the maximum charge rate:
   the EM to regeneratively decelerate the vehicle by generating negative torque, and to deliver power to the at least one battery at a regen rate,
   the CE to generate power to drive the EM to generate added negative torque to deliver power to the battery at an added rate, and
   such that the regen and added rates equal the maximum charge rate.

13. The vehicle according to claim 8, further comprising:
at least one regenerative brake coupled to a driveline of the vehicle; and
the controller configured to command, in response to the driver PD being less than the RLP and greater than the maximum charge rate:
   one or more of the EM and the at least one regenerative brake to regeneratively decelerate the vehicle by generating negative torque, and to deliver power to the battery at a regen rate,
   the CE to generate power to drive the EM to generate added negative torque to deliver power to the battery at an added rate, and
   such that the regen and added rates equal the maximum charge rate.

14. The vehicle according to claim 8, further comprising:
at least one of a regenerative brake and a friction brake coupled to a driveline of the vehicle; and
the controller configured to command, in response to the driver PD being less than the RLP and less than or equal to the maximum charge rate:
   one or more of the EM and the at least one regenerative brake to regeneratively decelerate the vehicle by generating negative torque, and to deliver power to the battery at a regen rate equal to the maximum charge rate, and the at least one friction brake to further decelerate the vehicle according to the driver PD, RLP, and the maximum Charge rate.

15. A method of controlling a vehicle, comprising:
providing a controller, combustion engine (CE), and motor generator (M/G) coupled to an energy storage system (ESS) having a state of charge (SoC) limit; and
responsive to a driver power demand (PD), commanding the CE to generate power exceeding the driver PD and a road load power (RLP) that is defined by performance parameters of the vehicle such that the M/G delivers a maximum charge rate defined by the ESS while the state of charge is below the SoC limit.

16. The method of controlling the vehicle according to claim 15, further comprising:
commanding by the controller, in response to the driver PD and RLP demanding power less than a maximum CE power,
the CE to generate the maximum CE power to accelerate the vehicle and to drive the M/G to generate negative torque to recharge the ESS while a SoC of the ESS is below the SoC limit.

17. The method of controlling the vehicle according to claim 15, further comprising:
commanding by the controller, in response to the driver PD and RLP being greater than or equal to a maximum CE power,
the CE and the M/G to generate a maximum combined power to accelerate the vehicle, such that the ESS discharges power to the MG at a rate according to the driver PD, RLP, and the maximum CE power.

18. The method of controlling the vehicle according to claim 15, further comprising:
commanding by the controller, in response to the driver PD being equal to the RLP,
the CE to generate a maximum CE power to maintain a velocity of the vehicle and to drive the M/G to generate negative torque to recharge the ESS while the SoC is below the SoC limit.

19. The method of controlling the vehicle according to claim 15, further comprising:
commanding by the controller, in response to the driver PD being less than the RLP and greater than the maximum charge rate:
the M/G to regeneratively decelerate the vehicle by generating negative torque, and to deliver power to the ESS at a regen rate, and
the CE to generate power to drive the M/G to generate added negative torque to deliver power to the ESS at an added rate, such that the regen and added rates equal the maximum charge rate.

20. The method of controlling the vehicle according to claim 15, further comprising:
providing at least one regenerative brake coupled to a driveline of the vehicle; and
commanding by the controller, in response to the driver PD being less than the RLP and greater than the maximum charge rate:
one or more of the M/G and the at least one regenerative brake to regeneratively decelerate the vehicle by generating negative torque, and to deliver power to the ESS at a regen rate,
the CE to generate power to drive the M/G to generate added negative torque to deliver power to the ESS at an added rate, and
such that the regen and added rates equal the maximum charge rate.

* * * * *